(12) United States Patent
Aliaga et al.

(10) Patent No.: US 8,896,660 B2
(45) Date of Patent: Nov. 25, 2014

(54) METHOD AND APPARATUS FOR COMPUTING ERROR-BOUNDED POSITION AND ORIENTATION OF PANORAMIC CAMERAS IN REAL-WORLD ENVIRONMENTS

(75) Inventors: Daniel G. Aliaga, Millington, NJ (US); Ingrid Birgitta Carlbom, Summit, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 2062 days.

(21) Appl. No.: 10/449,929

(22) Filed: May 30, 2003

(65) Prior Publication Data

US 2004/0239756 A1 Dec. 2, 2004

(51) Int. Cl.
*H04N 7/00* (2011.01)
*G08B 13/196* (2006.01)
*G06T 7/00* (2006.01)
*G05D 1/02* (2006.01)

(52) U.S. Cl.
CPC ........ *G06T 7/0042* (2013.01); *G08B 13/19643* (2013.01); *G06T 7/0018* (2013.01); *G05D 1/0234* (2013.01); *G05D 1/0246* (2013.01); *G08B 13/19608* (2013.01); *G06T 2207/30244* (2013.01)
USPC ............................................................ 348/36

(58) Field of Classification Search
CPC ................................................. H04N 5/23238
USPC .................................... 348/36, 169; 345/419
IPC ........................................................ H04N 7/00
See application file for complete search history.

(56) References Cited

U.S. PATENT DOCUMENTS

| 5,729,471 A | * | 3/1998 | Jain et al. ....................... 345/419 |
| 6,097,394 A | | 8/2000 | Levoy et al. |
| 6,118,474 A | | 9/2000 | Nayar |
| 6,765,569 B2 | * | 7/2004 | Neumann et al. ............. 348/169 |

OTHER PUBLICATIONS

U.S. Appl. No. 10/452,020, filed May 30, 2003, "Method and System for Creating Interactive Walkthroughs of Real-World Environment from set of Densely Captured Images".

(Continued)

*Primary Examiner* — Young Lee
(74) *Attorney, Agent, or Firm* — Ryan, Mason & Lewis, LLP

(57) ABSTRACT

Techniques for computing error-bounded position and orientation (pose) of a panoramic camera in real-world environments. Such environments may include large interior spaces (e.g., buildings) A space may include multiple rooms. For example, a technique for capturing images associated with an environment includes the following steps/operations. First, respective placements of fiducials in the environment are determined so as to satisfy at least one constraint. Images are captured, with an image capture device (e.g., camera), associated with the environment with the fiducials placed therein. A pose estimation of the image capture device is then determined based on projections of the fiducials in the captured images. The pose estimation may be optimized so as to obtain an optimal pose per image. Also, the fiducial placements may be optimized so as to obtain optimal fiducial placements. Then at least one constraint may include a constraint associated with the number of visible fiducials, a constraint associated with a distance from a viewpoint to a fiducial, and/or a constraint associated with an angle subtended by pairs of fiducials.

21 Claims, 8 Drawing Sheets

(56) References Cited

OTHER PUBLICATIONS

U.S. Appl. No. 10/452,314, filed May 30, 2003, "Method and Apparatus for Compressing and Decompressing Images Captured from Viewpoints Throughout N-Dimensional Space".
U.S. Appl. No. 10/452,019, filed May 30, 2003, "Method and Apparatus for Finding Feature Correspondences Between Images and Captured in Real-World Environments".
U.S. Appl. No. 10/156,189, filed Jun. 29, 2002, "Camera Model and Calibration Procedure for Omnidirectional Paraboloidal Catadioptric Cameras".
U.S. Appl. No. 10/122,337, filed Apr. 16, 2002, "Method and System for Reconstructing 3D Interactive Walkthroughs of Real-World Environments".
Shree K. Nayar, "Catadioptric Omnidirectional Camera," IEEE Computer Vision and Pattern Recognition (CVPR '97), 7 pages, 1997.
Henry Fuchs, "On Visible Surface Generation by a Priori Tree Structures," Computer Graphics, Proceedings of SIGGRAPH '890, pp. 124-133, 1980.
B. Triggs et al., "Bundle Adjustment—A Modern Synthesis," Vision Algorithms: Theory and Practice, Springer-Verlag, pp. 1-71, 2000.
J. Shi et al., "Good Features to Track," Proceedings of IEEE on Computer Vision and Pattern Recognition (CVPR94), Seattle, 8 pages, Jun. 1994.
E.H. Adelson et al., "The Plenoptic Function and the Elements of Early Vision," Computational Models of Visual Processing, MIT Press, pp. 1-20, 1991.
M. Levoy et al., "Light Field Rendering," Proceedings of ACM SIG-GRAPH 96, pp. 1-12, 1996.
S. Teller et al., "Calibrated, Registered Images of an Extended Urban Area," IEEE Computer Vision and Pattern Recognition (CVPR), pp. 1-20, 2001.
R. Koch et al., "Calibration ofHand-held Camera Sequences for Plenoptic Modeling," IEEE International Conference on Computer Vision (ICCV), 7 pages, 1999.
Camillo J. Taylor, "VideoPlus," IEEE Workshop on Omnidirectional Vision, 8 pages, Jun. 2000.
L.S. Nyland et al., "Capturing, Processing and Rendering Real-World Scenes," Videometrics and Optical Methods for 3D Shape Measurement Techniques, Electronic Imaging Photonics West, vol. 2309, 9 pages, 2001.

* cited by examiner

METHOD AND APPARATUS FOR COMPUTING ERROR-BOUNDED POSITION AND ORIENTATION OF PANORAMIC CAMERAS IN REAL-WORLD ENVIRONMENTS

CROSS REFERENCE TO RELATED APPLICATIONS

This application relates to U.S. patent applications identified as Ser. No. 10/452,314 entitled "Method and Apparatus for Compressing and Decompressing Images Captured from Viewpoints Throughout N-dimensional Space;" Ser. No. 10/452,020 entitled "Method and System for Creating Interactive Walkthroughs of Real-world Environment from Set of Densely Captured Images;" and Ser. No. 10/452,019 entitled "Method and Apparatus for Finding Feature Correspondences Between Images Captured in Real-world Environments," all filed concurrently herewith and commonly assigned, the disclosures of which are incorporated by reference herein.

FIELD OF THE INVENTION

The present invention relates to techniques for computing error-bounded position and orientation (pose) of a panoramic camera in real-world environments.

BACKGROUND OF THE INVENTION

Panoramic image sensors are becoming increasingly popular because they capture large portions of the visual field in a single image. These cameras are particularly effective for capturing and navigating through large, complex three-dimensional (3D) environments. Existing vision-based camera pose algorithms are derived for standard field-of-view cameras, but few algorithms have been proposed to take advantage of the larger field-of-view of panoramic cameras. Furthermore, while existing camera pose estimation algorithms work well in small spaces, they do not scale well to large, complex 3D environments consisting of a number of interconnected spaces.

Accurate and robust estimation of the position and orientation of image sensors has been a recurring problem in computer vision, computer graphics, and robot navigation. Stereo reconstruction methods use camera pose for extracting depth information to reconstruct a 3D environment. Image-based rendering techniques require camera position and orientation to recreate novel views of an environment from a large number of images. Augmented reality systems use camera pose information to align virtual objects with real objects, and robot navigation and localization methods must be able to obtain the robot's current location in order to maneuver through a (captured) space.

Existing vision-based camera pose approaches may be divided into passive methods and active methods. Passive methods derive camera pose without altering the environment but depend on its geometry for accurate results. For example, techniques may rely upon matching environment features (e.g., edges) to an existing geometric model or visual map. To obtain robust and accurate pose estimates, the model or map must contain sufficient detail to ensure correspondences at all times. Another class of passive methods, self-tracking methods, use optical flow to calculate changes in position and orientation. However, self-tracking approaches are prone to cumulative errors making them particularly unsuited for large environments.

Active methods utilize fiducials, or landmarks, to reduce the dependency on the environment geometry. Although fiducial methods are potentially more robust, the number and locations of the fiducials can significantly affect accuracy. Existing techniques often focus on deriving pose estimates from a relatively sparse number of (noisy) measurements. For large arbitrarily shaped environments, there does not exist a method for determining the optimal number of fiducials or their optimal placement in order to achieve a desired camera pose accuracy.

Thus, there exists a need for techniques that overcome the above-mentioned drawbacks by providing techniques for determining the optimal number of fiducials and their optimal placement, in order to achieve a desired camera pose accuracy.

SUMMARY OF THE INVENTION

The present invention provides techniques for computing error-bounded position and orientation (collectively referred to as pose) of a panoramic camera in real-world environments. Such environments may comprise large interior spaces (e.g., buildings), wherein a space may comprise multiple rooms. The camera may move anywhere within the environment. The camera may be handheld, placed on a tripod, fixed on a mobile robot, or in any other suitable configuration as would be obvious to one skilled in the art. Position refers to the location of the effective center-of-projection of the camera within the environment. This position is also referred to as the "viewpoint" of the image or the "position" of the camera. Orientation refers to the angular relationship between the coordinate frame of the camera and the coordinate frame of the real-world.

In one aspect of the invention, a technique for computing the position and orientation of a camera within an environment comprises the following steps/operations. First, a planning algorithm is used to place fiducials in an environment so as to satisfy at least one constraint. The at least one constraint may comprise a constraint associated with the number of fiducials visible from any viewpoint within the environment, a constraint associated with a distance from a viewpoint to a fiducial, and/or a constraint associated with an angle subtended by vectors from a viewpoint to pairs of fiducials. Second, a pose estimate of the camera is determined based on projections of the fiducials in the captured images. Using an analytic error model, the invention can bound the pose estimation error. Given a set of fiducial positions, the invention can provide bounds on the pose estimation error for viewpoints within the environment. Conversely, given an error bound, the invention can suggest a set of optimal fiducial positions.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The following description will illustrate the invention in the context of an exemplary indoor, multi-room environment. It should be understood, however, that the invention is not necessarily limited to use within any particular environment. Furthermore, the invention may be used within the context of several larger systems or applications. By way of example only, the invention may be used for the rendering of interactive walkthroughs or visualizations, based on the captured images, for presentation to one or more observers. As is known, "interactive walkthroughs" are types of computer graphics applications, where an observer moves within a virtual environment. Similarly, the invention may be used to compute the position and orientation of a camera attached to a robotic device moving within an environment. Robot navigation has several applications within exploration, reconnaissance, and machine automation.

As will be evident from the illustrative explanations to follow, the present invention provides a robust camera pose algorithm and a working system to compute bounded-error estimates of the position and orientation of the viewpoint of the panoramic images captured within large, arbitrarily complex environments. A planning algorithm is used to place fiducials in an environment so as to satisfy a set of fiducial constraints, which may include the number of visible fiducials, the distance from the viewpoint to the fiducials, and the angle subtended by pairs of fiducials. Using an analytic error model, the invention can either provide fiducial placements to achieve a desired camera pose estimation accuracy, or bound the pose estimation error for a given fiducial placement.

Figure 1:
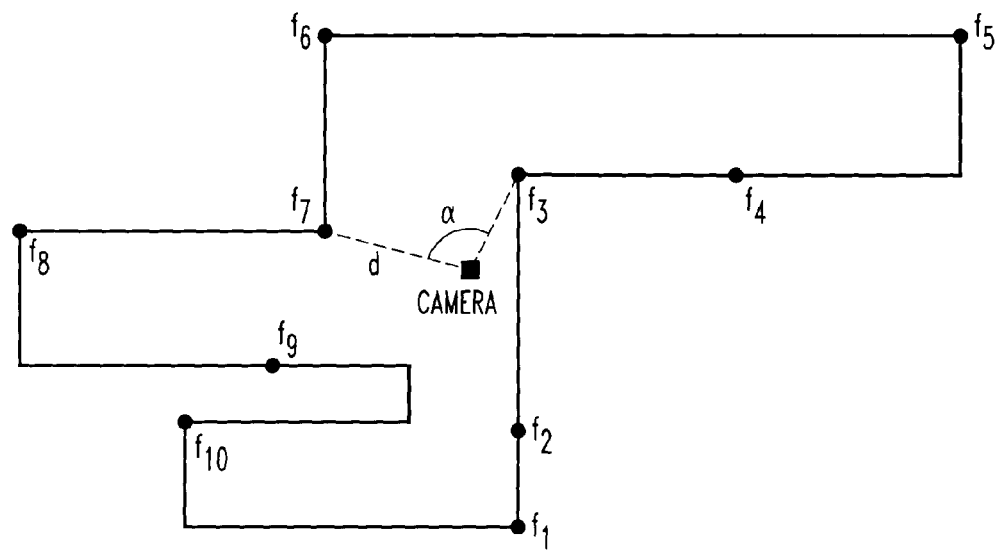
FIG. 1 is a diagram illustrating an example of a floor plan and fiducial locations, according to an embodiment of the present invention.

Referring initially to FIG. 1, a diagram illustrates an example of a floor plan and fiducial locations ($f_1$ through $f_{10}$) that, from all camera viewpoints within the environment, satisfy a set of visibility, distance and angle constraints. In general, the invention provides for inserting small portable fiducials (e.g., light boxes, beacons, or any clearly visible objects) into an environment and triangulating camera pose from the projections of the fiducials onto the panoramic images. The invention uses a coarse two-dimensional (2D) floor plan and a heuristic solution to suggest fiducial locations that satisfy the fiducial constraints for viewpoints within the environment. Exact fiducial locations are not necessary at this point, and will be obtained later via an optimization method. At the expense of more fiducials, enforcing stricter constraints increases pose estimation accuracy.

The working system requires little setup time and does not significantly alter the environment. The inventive approach is usable within many different environments. By way of one example only, the invention is capable of operating in an environment covering 500 to 1000 square feet, with an average pose accuracy of up to 0.66 cm. However, as mentioned above, the invention is not limited to any particular environment.

The element generally referred to in FIG. 1 as "camera" may be implemented by a variety of capture subsystems. In a preferred embodiment, the capture subsystem and calibration techniques described in the U.S. patent application identified as Ser. No. 10/122,337 filed on Apr. 16, 2002 and entitled "Method and System for Reconstructing 3D Interactive Walkthroughs of Real-World Environments," and the U.S. patent application identified as Ser. No. 10/156,189 filed on Jun. 29, 2002 and entitled "A Novel Camera Model and Calibration Procedure for Omnidirectional Paraboloidal Catadioptric Cameras," the disclosures of which are incorporated by reference herein, may be employed. Such capture subsystem and calibration techniques may be employed so as to enable the capture of a wide range of dense viewpoints in complex interior environments of unknown geometry.

Such a capture subsystem may comprise a system for navigating a free-moving (untethered) cart, via remote control (automatically or manually), so as to capture images of the environment. The cart may contain a panoramic camera (as described in the above-referenced Ser. No. 10/122,337 or Ser. No. 10/156,189), associated computer, electric motors, and a battery for all power requirements. Moreover, the capture system may be able to simultaneously capture images and navigate through the environment, so as to reduce the capture time. Preferably, the camera captures large field-of-view (FOV) images so as to permit an immersive experience where the observer (of images captured by the camera subsystem) can look in almost any direction. In an exemplary embodiment, the capture subsystem acquires images within a plane (e.g., an eye-level plane). However, the invention is not limited to such capture subsystems and may be used with images captured from anywhere within the open-space of the environment.

Several different panoramic (or omnidirectional) camera designs may be employed. In a preferred embodiment, a paraboloidal catadioptric camera is used, see, for example, S. Nayar, "Catadioptric Omnidirectional Camera," IEEE Computer Vision and Pattern Recognition (CVPR), pp. 482-488, 1997, the disclosure of which is incorporated by reference. This camera captures a hemispherical FOV of the environment with a single center-of-projection (COP) and 1024× 1024 pixel images. A FOV spanning 360 by 180 degrees in front of the mirror is reflected onto an image plane that is parallel to and lies in front of the mirror. Since the horizon is located at the mirror border, the vertical FOV spans 0 to −90 degrees. Because the camera has a single COP, simple transformations can be applied to obtain cylindrical and planar re-projections.

Calibration of the intrinsic camera parameters, which are typically fixed for the entire capture session. may be done in accordance with the calibration techniques described in the above-referenced Ser. No. 10/156,189. A traditional method, such as the method of S. Nayar, "Catadioptric Omnidirectional Camera", Proceedings of IEEE Conference On Computer Vision and Pattern Recognition (CVPR '97), pp. 482-

488, 1997 (and also in U.S. Pat. No. 6,118,474 entitled "Omnidirectional Imaging Apparatus"), assumes that the lens projection is perfectly orthographic. However, by relaxing this assumption, intrinsic parameters are obtained that yield pose estimations an order of magnitude more accurate.

Furthermore, as will be explained in illustrative detail below, the invention provides a fiducial planning algorithm for determining fiducial placements for arbitrarily complex environments. By creating a network of fiducials, pose can be estimated in large environments, potentially consisting of multiple interconnected spaces (or rooms). Solutions vary from those containing a minimal number of fiducials to solutions containing a highly-redundant set of fiducials that provide high-accuracy pose estimation. Further, the invention provides an error model that conservatively approximates the region of pose uncertainty allowing for a determination of bounds on pose estimation error. Moreover, it allows for proposal of fiducial placements for achieving a desired degree of pose accuracy.

Figure 2:
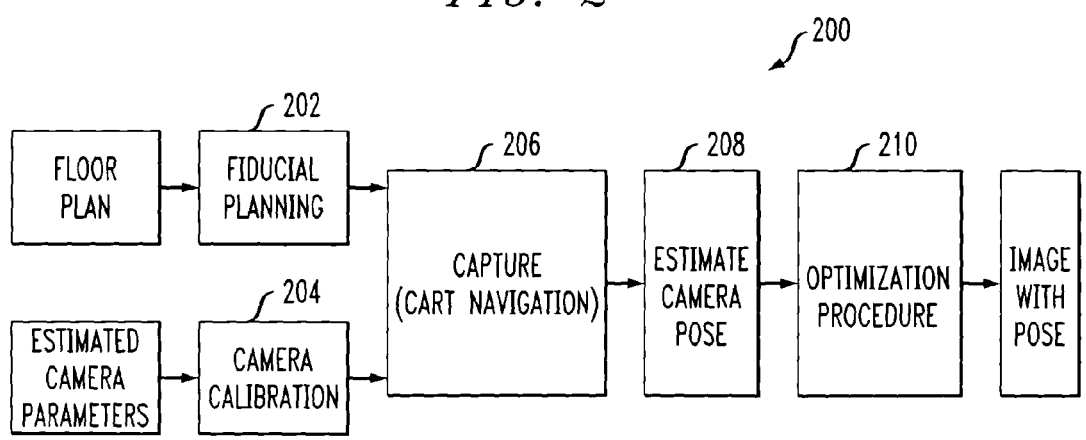
FIG. 2 is a flow diagram illustrating an overall pose estimation methodology employable by a pose estimation system, according to an embodiment of the present invention.

Referring now to FIG. 2, an operational flow diagram illustrates an overall pose estimation methodology employable by a pose estimation system, according to an embodiment of the present invention. As shown, methodology 200 comprises a fiducial planning step 202, a camera calibration step 204, a capture step 206, an estimate camera pose step 208, and an optimization procedure step 210. Each step will be generally explained below. More detailed explanations of algorithms (methodologies) used to implement the steps of FIG. 2 will follow thereafter.

In step 202, the fiducial planning component suggests fiducial locations in at least a simple floor plan of the environment in order to meet a set of constraints, yielding a certain degree of pose accuracy. By enforcing stricter constraints, we can increase pose accuracy. Alternatively, given a set of fiducial locations in the floor plan of the environment, the fiducial planning algorithm can determine what level of constraint satisfaction and degree of pose accuracy are accomplished.

In step 204, the system uses estimated camera parameters and a calibration algorithm to create a calibrated camera model. As mentioned above, the calibration algorithm used may be the algorithm described in the above-referenced Ser. No. 10/156,189.

In step 206, once the fiducials have been placed in the environment, a cart containing the panoramic camera is navigated through the environment. By way of example, the cart may contain a panoramic camera, computer, electric motors, and a battery for all power requirements, as described in the above-referenced Ser. No. 10/122,337 and Ser. No. 10/156,189. The cart may be navigated manually and/or automatically.

In step 208, camera pose is estimated. As mentioned, the captured images contain projections of the fiducials placed throughout the environment. By tracking these fiducial projections, either in real-time or a posteriori, camera pose can be estimated.

In step 210, an optimization procedure can subsequently be performed to obtain a global refinement of camera pose and fiducial locations. Once the procedure terminates, a set of images with globally optimized camera pose is produced.

The remainder of the detailed description is divided into the following sections for ease of reference: (I) Fiducial Planning; (II) Fiducial Tracking and Pose Estimation; (III) Error Model; and (IV) Illustrative Implementation.

I. Fiducial Planning

A. Placement Constraints

The objective of the planning algorithm of the invention is to place fiducials so that predefined fiducial constraints are satisfied for all viewpoints within an environment. This problem is related to the classical art-gallery problem described in J. O'Rourke, "Art Gallery Theorems and Algorithms," Oxford University Press, New York, 1987, whose complexity is known to be NP-complete. In an illustrative embodiment, the invention positions fiducials so as to satisfy the following constraints:

Visibility: at least V≥2 fiducials must be visible from every position in the environment to allow pose estimation by triangulation.

Distance: the distance d from the viewpoint to any fiducial used for pose estimation must be less than or equal to a predetermined distance D. This reduces errors from measuring excessively large distances as well as prevents the tracking of fiducials whose projections become too small.

Angle: the angle α subtended by the vectors from the viewpoint to at least one pair of currently visible fiducials, both meeting the distance constraint, is greater or equal to a predetermined angle A≤180 degrees. This avoids small acute angles that may lead to numerical problems.

B. Planning Algorithm

The invention uses a heuristic approach to find a near-minimum number of fiducial locations, $f_i$, for a given set of constraint values V, D, and A. Steps of the planning algorithm will be generally described below, followed by description of a flow chart of an illustrative methodology that embodies principles of the planning algorithm.

The first step creates an initial sufficient number of fiducials by decomposing the floor plan into convex planar polygons (using a binary space partition) and placing a fiducial at every polygon vertex. The polygons are further subdivided until the distance and angle constraints are met. To ensure that viewpoints within all polygons meet the visibility constraint, the polygon edges are partitioned until at least V vertices per polygon are present.

The next step iteratively removes fiducials to obtain a near-minimum set for satisfying the constraints. In order to decide which fiducials to remove, the algorithm prioritizes fiducials based on their effectiveness in satisfying the constraints. Fiducials at reflex vertices (e.g., corners) are the most desirable because they form an approximate solution to the problem for a convex decomposition of space. Fiducials in the interior of the environment are least desirable because they may interfere with camera movement. Hence, the algorithm separates the initial fiducial set into three lists: interior fiducials, wall fiducials, and reflex fiducials. Then, the algorithm attempts to reduce the number of fiducials by first removing the interior fiducials, then the wall fiducials, and finally the reflex fiducials, while still satisfying the constraints of visibility, distance, and angle.

To find the most redundant fiducial within a particular list, the algorithm may calculate a redundancy value, $r_i$, that estimates how removing the fiducial affects the local constraints. First, the algorithm computes the redundancy value for all fiducials. Then, from among these fiducials, the one with the highest redundancy value is tested for removal. This process is performed iteratively until no more fiducials can be removed while still satisfying the constraints.

The algorithm may calculate the redundancy value as a weighted sum of how much the minimum number of visible fiducials, $v_{min}$, differs from V, how much the minimum distance to another fiducial, $d_{min}$, differs from D, and how much the minimum subtended angle, $\alpha_{min}$, differs from A, using weights $w_v$, $w_d$, and $w_\alpha$, respectively:

$$r_i = w_v |v_{\min} - V| + w_d \left| \frac{D - d_{\min}}{D} \right| + w_a \left| \frac{\alpha_{\min} - A}{180 - A} \right|. \quad (1)$$

Figure 3:
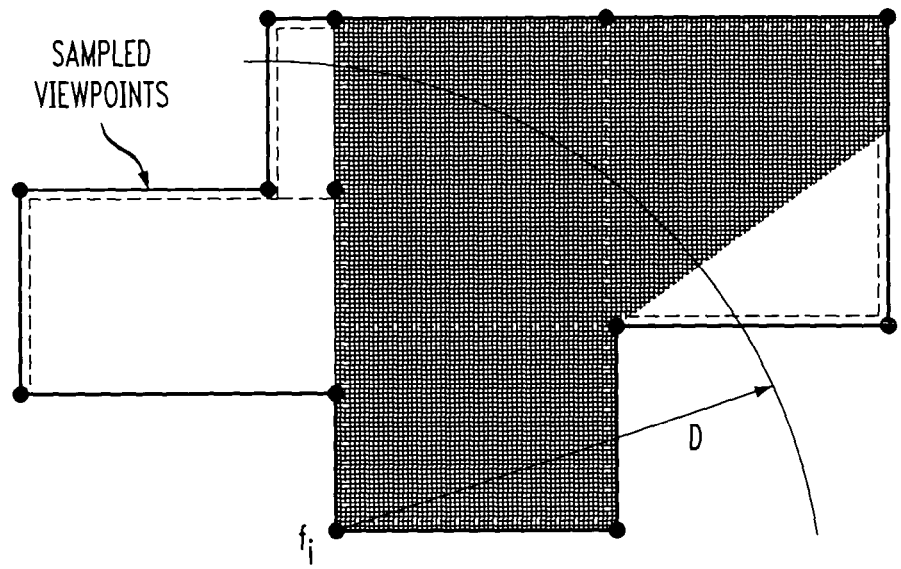
FIG. 3 is a diagram illustrating fiducial removal, according to an embodiment of the present invention.

To determine if a fiducial can be safely removed, the algorithm temporarily removes the fiducial and verifies the constraints from all viewpoints visible from the location of the removed fiducial and within distance D. This is illustrated in FIG. 3. For each convex region of viewpoints, the algorithm checks the constraints from a dense sampling of viewpoints along the perimeter and exploits the following three properties to ensure the constraints are met for all interior viewpoints:

1. If from every viewpoint along the perimeter of a convex region at least V fiducials outside the region are visible, then for any viewpoint inside the region, at least V fiducials outside the region are also visible.
2. The maximum distance between a viewpoint inside a convex region to a particular fiducial outside the region is less than the largest distance between a viewpoint on the perimeter of the region and the same fiducial.
3. The smallest angle subtended by vectors from a viewpoint inside a convex region to a pair of fiducials outside the region is greater than the smallest angle subtended by vectors from a viewpoint on the perimeter of the region and the same fiducial pair.

Note that the shaded area in FIG. 3 represents the area visible from $f_i$ and the circular arc represents the border of the area within distance D.

C. Illustrative Methodology

Figure 4:
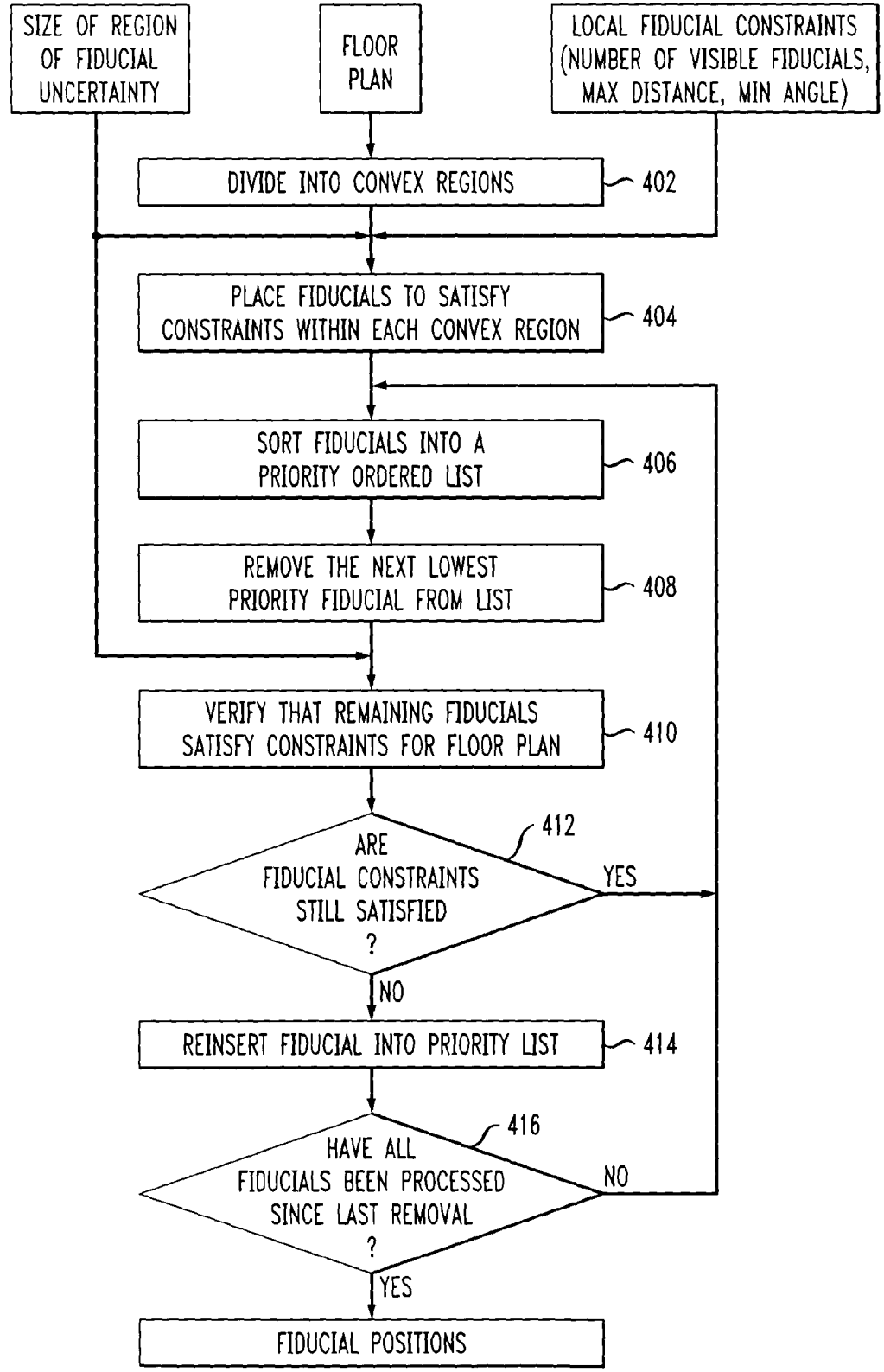
FIG. 4 is a flow diagram illustrating a planning methodology, according to an embodiment of the present invention.

Referring now to FIG. 4, a flow diagram illustrates a planning methodology implementing the above-described principles, according to an embodiment of the invention. With reference back to the overall pose estimation system of FIG. 2, it is to be understood that planning methodology 400 may be implemented in block 202. Planning methodology 400 starts at step 402 by dividing the provided floor plan into convex regions. A binary-space partitioning tree may be used to divide the floor plan into convex regions, see, for example, H. Fuchs et al., "On Visible Surface Generation by a Priori Tree Structures," Computer Graphics, Proceedings of SIG-GRAPH '80, pp. 124-133, 1980, the disclosure of which is incorporated by reference herein.

In step 404, for each convex region, fiducials are placed so as to satisfy a set of local constraints. By the way of example, as mentioned above, these constraints can be one or more of a minimum number of visible fiducials, a maximum distance to visible fiducials, a minimum subtended angle between pairs of visible fiducials, and a maximum size of the positional uncertainty region. By way of example, the positional uncertainty region is approximated by first assigning to each fiducial a certain degree of position uncertainty (or conversely, an uncertainty of the distance measurement to that fiducial). This defines a ring around each fiducial within which the camera may lie. By intersecting the rings of several fiducials, the methodology can compute a bound on the position uncertainty of the actual camera position.

In step 406, the fiducials are sorted by priority into a list. The priority is proportional to its contribution and utility to camera pose estimation. By way of example, fiducials are divided into three classes (corner fiducials, wall fiducials, interior fiducials) and within each class a priority value representing its usefulness is computed. The usefulness value of a fiducial is computed as the inverse weighted sum of how well each of the constraints are satisfied from the position of the fiducial.

In step 408, the methodology iteratively removes fiducials until no more fiducials can be removed while still satisfying all constraints. By way of example, the methodology starts with the lowest priority fiducial (that is, the fiducial that is most likely to be redundant), and proceeds to iteratively remove the next lowest priority fiducial from the list.

In accordance with steps 410 and 412, if, after removing the lowest priority fiducial, the remaining constraints (including the desired pose estimation positional accuracy) are still satisfied, then the removed fiducial is redundant and can be discarded. The methodology continues to process the fiducials in priority order.

In step 414, if the fiducial cannot be removed without violating one or more of the fiducial constraints, it is re-inserted into the list.

Lastly, in step 416, once a stable set of fiducials is reached (i.e., no more fiducials can be removed while still satisfying all constraints) the methodology ends and a set of fiducial positions is output.

II. Tracking and Pose Estimation

As the panoramic camera moves through the environment, the invention captures images and tracks the projections of the fiducials placed in the environment. In this section, illustrative descriptions of a tracking algorithm, a pose estimation method, and a global optimization are described.

A. Tracking

The tracking algorithm calculates for every image the projection of the visible fiducials. The algorithm is initialized with either a user-provided camera pose estimate or user-identified fiducial projections. The algorithm predicts a projected position of a fiducial in subsequent images from its position in at least one previous frame and an approximation to its image-space velocity. To handle occlusion changes, the 3D fiducial locations in the floor plan determine which fiducials should be visible in the image. The actual projection of a fiducial is searched for in a small window surrounding the predicted projection of the fiducial. Within each search window, the fiducial projection is selected from among all approximately circular blobs of pixels that exceed an intensity threshold. To decide if a blob of pixels is circular, the algorithm compares its actual circumference and aspect ratio to that of a circle of similar radius. The tracker is initialized with the blob whose radius is closest to the predicted radius, but for subsequent images, the algorithm chooses the blob that best correlates with the fiducial projection of the previous image and has a radius similar to the predicted radius.

B. Pose Estimation

The pose estimation algorithm obtains position and orientation estimates by triangulating the camera with pairs of tracked fiducials that are within distance D from the camera and subtend an angle greater than or equal to A degrees. If the number of tracked fiducials is T, then the algorithm obtains at most $$R = \binom{T}{2}$$

valid fiducial pairs and estimates. In a real-time system, the algorithm combines these estimates using, for example, weighted averaging.

For an exemplary embodiment that captures images within a plane, calculating the camera position and orientation ($x_{ij}$, $y_{ij}$, $\omega_{ij}$) relative to the i-th and j-th fiducial, the algorithm uses the tracked fiducial coordinates ($u_i$, $v_i$) and ($u_j$, $v_j$), and a calibrated camera model. First, the algorithm obtains the distances $d_i$ and $d_j$, as projected onto the horizontal plane, between the camera's focal point and both fiducials. Then, the algorithm computes the angle $\alpha_{ij}$ between the vectors from the focal point to the fiducials and estimates the distance between the two fiducials ($d_{ij}$). Using these values, the algorithm solves an over-determined triangulation to obtain the camera's position and orientation relative to the fiducial pair. Finally, by using the world-space coordinates of the fiducials, the algorithm derives the camera's position and orientation in world-space.

C. Global Optimization

To determine a globally consistent set of camera poses and 3D fiducial locations, the invention preferably uses an optimization procedure. This optimization procedure may be based on bundle adjustment algorithms. Bundle adjustment is a non-linear least squares optimization method, see for example B. Triggs et al., "Bundle Adjustment—A Modern Synthesis," Vision Algorithms: Theory and Practice, Springer-Verlag, 2000, the disclosure of which is incorporated by reference herein. The optimization procedure alternates between computing pose estimates from the fiducial locations and computing the fiducial locations from a subset of the camera pose estimates (e.g., about 10% of the pose estimates uniformly distributed through the dataset).

The goal of the optimization procedure is to find for each fiducial i its 3D location $(X_i, Y_i, Z_i)$ and for each image k its global camera pose $(\hat{x}_k, \hat{y}_k, \hat{\omega}_k)$ that minimizes the difference between the observed fiducial projections $(u_{ik}, v_{ik})$ and the projections of the current fiducials. The function $P(X_i, Y_i, Z_i, \hat{x}_k, \hat{y}_k, \hat{\omega}_k)$ expresses the projection from world-space onto the panoramic images. If the observed error is zero-mean Gaussian, the optimization procedure corresponds to a maximum likelihood estimator. The error term for the optimization procedure is given as (the Cronecker delta term $\delta_{ik}$ is 1 when fiducial i is tracked on image k):

$$e = \sum_i \sum_k \delta_{ik} \| \vec{P}_{ik}(X_i, Y_i, Z_i, \hat{x}_k, \hat{y}_k, \hat{\omega}_k) - (u_{ik}, v_{ik}) \| \quad (2)$$

When this process has converged, the algorithm obtains a set of panoramic images with calibrated camera parameters.

Figure 5:
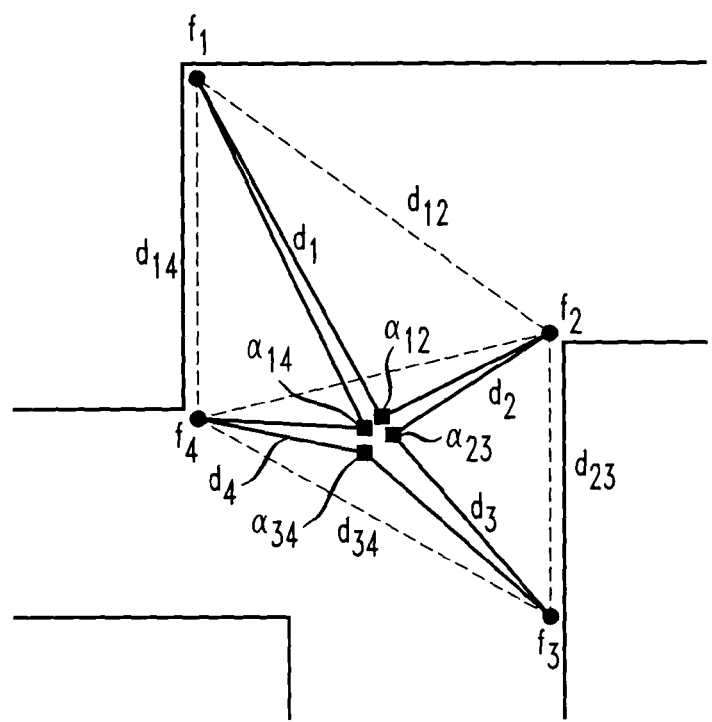
FIG. 5 is a diagram illustrating optimization, according to an embodiment of the present invention.

FIG. 5 illustrates the optimization process for several fiducials $f_i$, distances $d_i$, and subtended angles $\alpha_{ij}$. As explained above, given multiple triangulations, an optimization procedure is performed to minimally perturb the pose estimates and fiducial locations so as to obtain the set of fiducial locations and pose estimates that minimize the differences between the fiducial projections and the tracked fiducials.

D. Illustrative Methodologies

Figure 6:
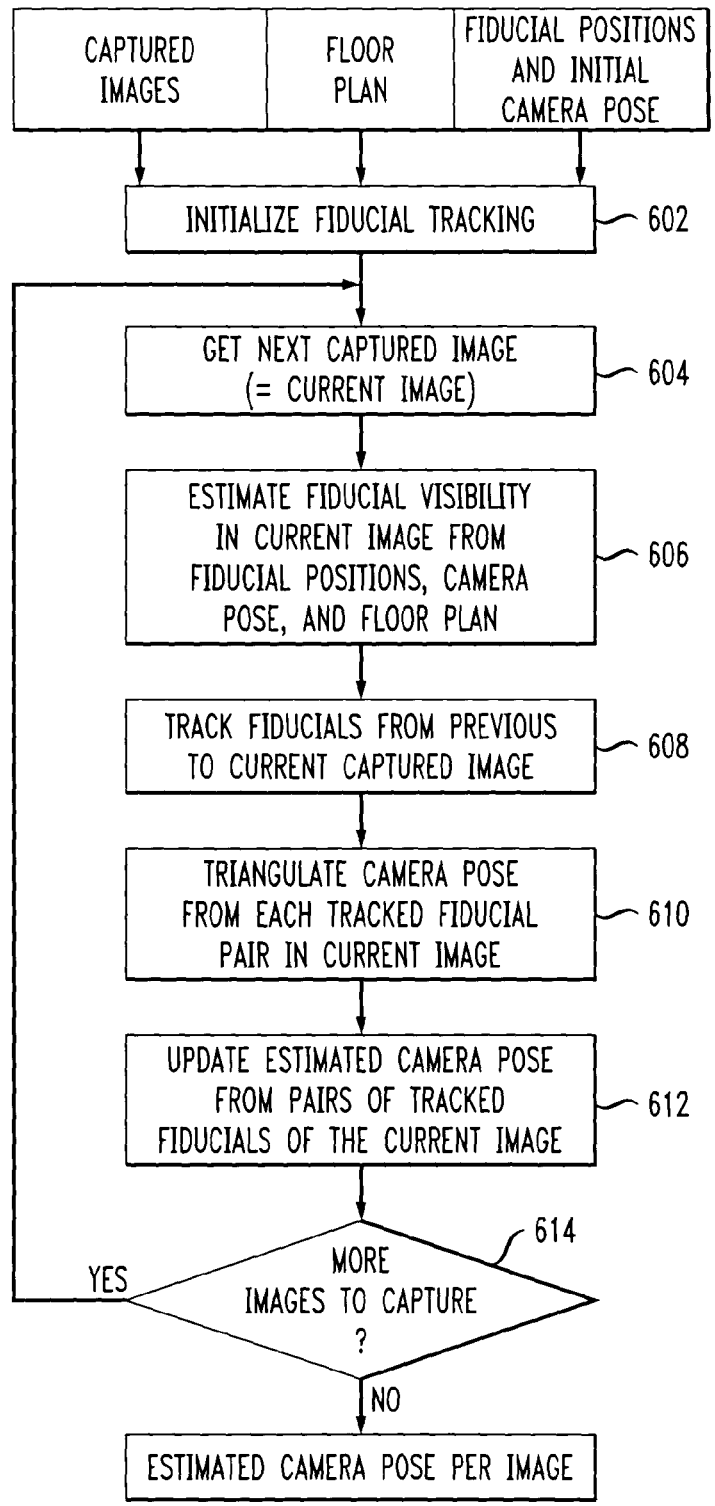
FIG. 6 is a flow diagram illustrating a pose estimation methodology, according to an embodiment of the present invention.

Referring now to FIG. 6, a flow diagram illustrates a pose estimation methodology implementing the above-described principles, according to an embodiment of the invention. With reference back to the overall pose estimation system of FIG. 2, it is to be understood that pose estimation methodology 600 may be implemented in block 208.

In step 602, the camera pose estimation is initialized with the first captured image, a floor plan, estimated fiducial positions, and an initial camera pose for the first captured image. Depending on the accuracy of the initial estimates, human intervention may be required during initialization.

In step 604, the next captured image is obtained. This can be done in real-time or after all images are captured.

In step 606, for each captured image, the algorithm begins by estimating which fiducials might be visible. By way of example, this may be done by performing visibility computations using the floor plan, estimated fiducial locations, and camera pose from the previous (or initial) frame.

In step 608, fiducials are tracked from the previous frame to the current frame. By way of example, general feature tracking algorithms may be used for this purpose, see, for example, J. Shi et al., "Good Features to Track," Proceedings of IEEE Conference on Computer Vision and Pattern Recognition (CVPR94), Seattle, June 1994, the disclosure of which is incorporated by reference herein.

In step 610, from all pairs of tracked fiducials, the algorithm triangulates the position and orientation (pose) of the camera relative to the static fiducials placed in the environment.

In step 612, from these multiple camera pose estimates, a single camera pose estimate for the current image is calculated. By way of example, the single camera pose for the entire image may be obtained via weighted averaging.

In accordance with step 614, steps 604 through 612 are repeated until there are no more captured images.

Figure 7:
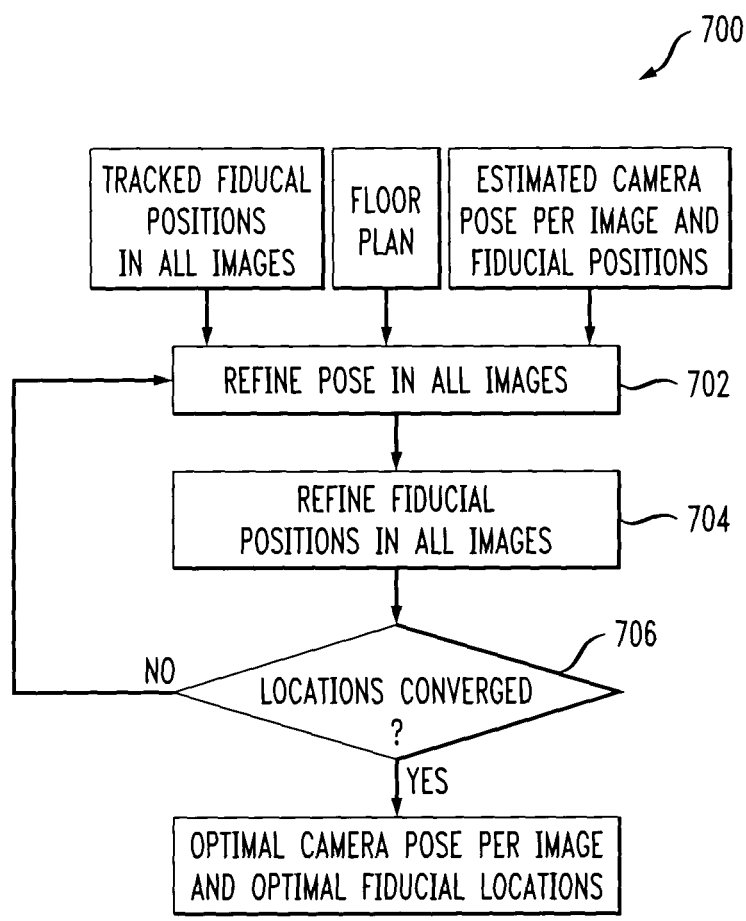
FIG. 7 is a flow diagram illustrating an optimization methodology, according to an embodiment of the present invention.

Referring now to FIG. 7, a flow diagram illustrates an optimization methodology implementing the above-described principles, according to an embodiment of the invention. With reference back to the overall pose estimation system of FIG. 2, it is to be understood that pose estimation methodology 700 may be implemented in block 210.

In step 702, an optimization method is used to refine the per-image camera pose. By way of example, a Levenberg-Marquant algorithm is used to reduce the difference between the projections of the assumed 3D fiducial locations and the actual tracked fiducials, see, for example, W. Press et al., "Numerical Recipes in C," The Art of Scientific Computing, 2nd edition, 1992, the disclosure of which is incorporated by reference herein.

In step 704, an optimization method is used to refine the fiducial locations. By way of example, a Levenberg-Marquant algorithm is again used to reduce the difference between the projections of the assumed 3D fiducial locations and the actual tracked fiducials.

Lastly, once the system converges in accordance with step 706, an optimum set of camera poses and fiducial locations are produced.

III. Error Model

The invention provides an error model in order to bound the uncertainty of the pose estimates computed by the pose estimation algorithm. Given fiducials placed in an environment, an image sequence through the environment, and tracked fiducial projections, the model computes for each image the region of the environment that may contain the camera's center-of-projection (COP). In addition, the error model allows formulation of a tradeoff between the fiducial constraints and the pose estimation accuracy.

There are multiple sources of error that may cause uncertainty in pose estimates. In the present system, the dominant source of error is the positional uncertainty of the fiducials. The global optimization begins with approximate fiducial locations and obtains optimal position estimates for the fiducials. Nevertheless, there may still be uncertainty in their positioning. Since camera pose is triangulated from their 3D positions, this directly affects the accuracy of camera pose.

Angular measurement errors are another source of uncertainty, especially for distant fiducials. Since it is difficult to determine the center of each fiducial projection with subpixel accuracy, in an exemplary embodiment, it is assumed that all angle measurements have an error equal to the angle subtended by a pixel. More accurate models of angular error can also be employed with the pose estimation system of the invention.

There are additional sources of uncertainty, in particular tracking errors and camera calibration errors. The fiducials used in accordance with the invention are preferably chosen so that good tracking can be assumed. Gross tracking errors may be avoided by ignoring outliers. Calibration errors for the camera are small and are close to the limiting accuracy of a panoramic sensor of the type and resolution preferably used.

Figure 8:
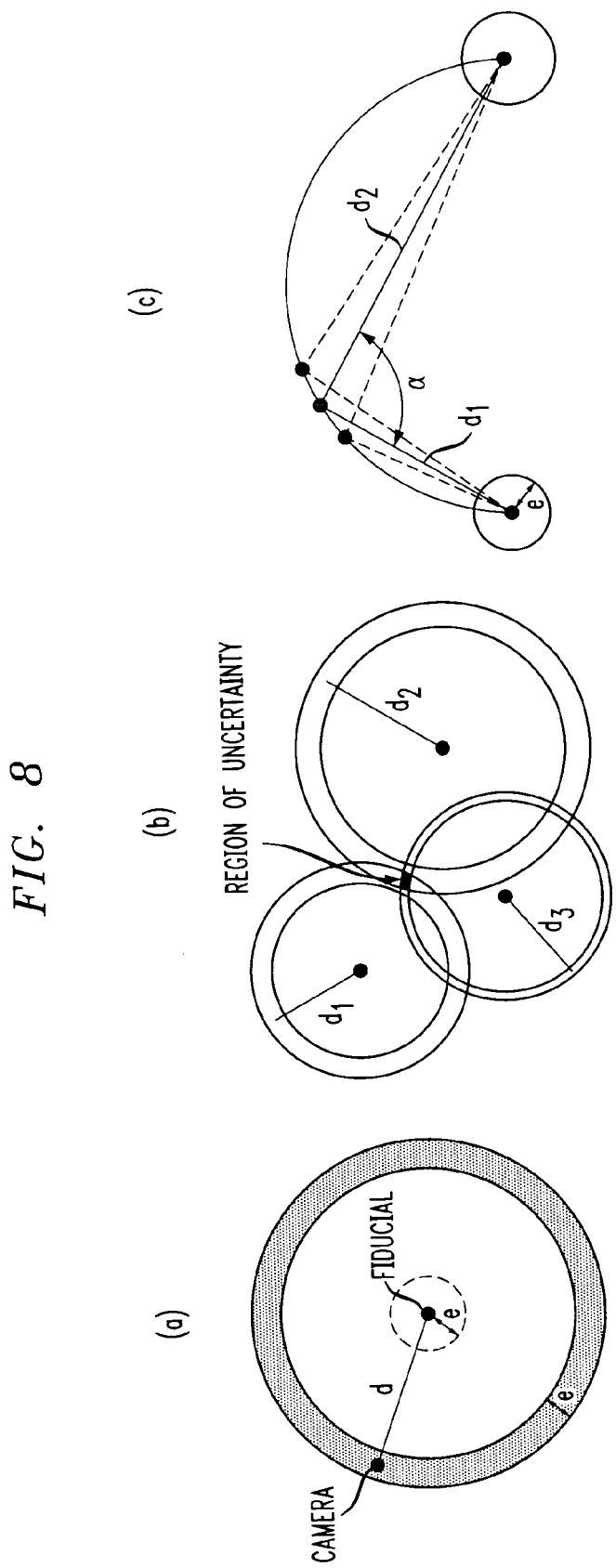
FIGS. 8A through 8C are diagrams illustrating regions of uncertainty for pose estimates, according to an embodiment of the present invention.

FIGS. 8A through 8C depict the region of uncertainty for pose estimates assuming only distance measurements. Given the position of a single fiducial with error e and a distance estimate d between the camera's COP and the fiducial, the camera may lie anywhere within an annulus surrounding the fiducial (FIG. 8A). For multiple fiducials and distance estimates, the region of uncertainty can be constructed by intersecting the annuli surrounding each fiducial (FIG. 8B).

The camera pose algorithm also provides measurements of the observed angle between the COP of the camera and pairs of fiducials. These angle measurements further restrict the region of uncertainty for the pose estimates. In particular, for a given pair of tracked fiducials, the cosine rule can be used to formulate a relationship between the distance estimates and the observed angle. For example, as shown in FIG. 8C, an observed angle of $\alpha=90$ degrees restricts the camera to lie on a (semi) circle that passes through both fiducials. In general, the camera is restricted to lie on a smooth curve that can be computed from the cosine rule. However, since relatively small segments of this curve are of concern, it is assumed that the curve locally be an arc of a circle.

The overall region of uncertainty is approximated by using axis-aligned bounding boxes. To intersect a pair of annuli, the exact intersection (e.g., by intersecting pairs of circles) is computed and then the intersection is surrounded with an axis-aligned bounding box. To intersect one annuli intersection with another, the bounding boxes are intersected.

IV. Illustrative Implementation

While an illustrative implementation of a pose estimation system is described below, it is to be appreciated that the invention is in no way intended to be limited to this implementation.

A pose estimation system was implemented in C/C++ running under the Microsoft Windows Operating System in a client-server arrangement. The server sits on a motorized cart that also carries the panoramic camera, disks to store capture data, and a large battery.

The client computer is a laptop that communicates with the server via a wireless Ethernet connection. The motorized cart is controlled via a radio remote control unit.

The panoramic camera uses a high-resolution 3-CCD color video camera (JVC KY-F70, 1360×1024 progressive pixels at 7.5 Hz (Hertz)) and a calibrated paraboloidal catadioptric system based on a commercial Cyclovision/Remote Reality S1 unit. Each frame contains the bottom-half of a hemispherical view of the environment. We capture frames and transfer-to-disk at an average rate of 6.5 frames-per-second. The decrease from 7.5 Hz to 6.5 Hz is due to disk performance and not algorithm overhead. Since the cart moves at an average speed of 0.2 m/sec (meters/second), we are simulating a capture frame rate of roughly 30 Hz for a robot moving at a speed of 1 m/sec.

The server and client statically partition the tasks so as to reduce the server load while also maintaining low network traffic. The server captures frames, tracks fiducials, and computes estimated camera pose. The client maintains the floor plan and information about the fiducial configuration. For every frame, the client uses the current pose estimate to send the server the current fiducial visibility estimate. The server sends back the camera pose. For graphical feedback, the server optionally transmits a low-resolution captured frame and the location of the tracked fiducials.

The client application consists of a graphical interface that communicates with the server via TCP/IP (Transmission Control Protocol/Internet Protocol).

Figure 9:
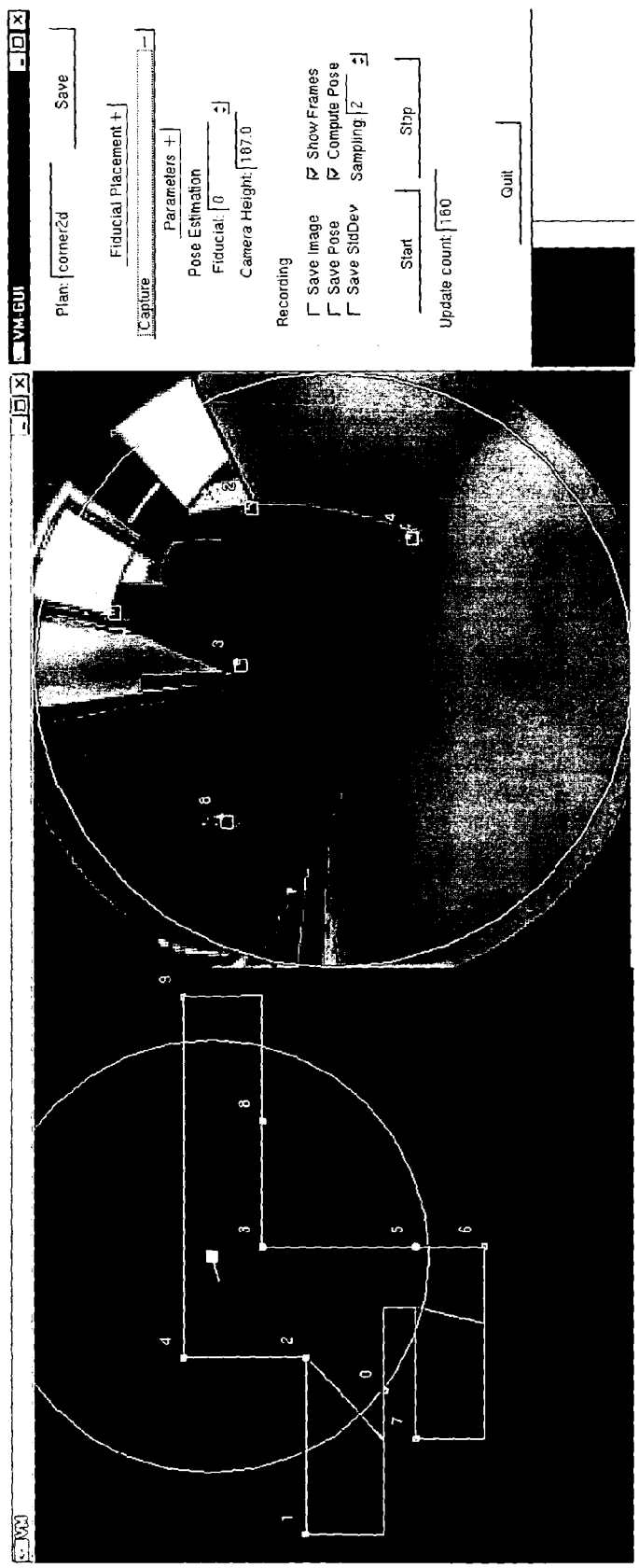
FIG. 9 is a diagram illustrating a client interface, according to an embodiment of the present invention.

An example of the graphical interface is shown in FIG. 9. A typical session begins with a display of a floor plan. The interface allows the user to select the constraint values and compute fiducial locations. To begin a capture and tracking session, the user provides an initial estimate of the position and orientation of the cart or uses the mouse to click on initial fiducial projections.

The server application waits for instructions from the client. Upon receiving a camera pose estimate and a fiducial visibility estimate, it attempts to find and track the actual fiducials in the current captured frame. The resulting camera pose estimate is transmitted back to the client. Frames and pose data are optionally saved to disk in real-time. After capture, the user may perform the global optimization over the captured data to improve pose estimates. We use small battery-powered light bulbs as fiducials because they are easy to track and their projections are at least a few pixels wide even at a camera distance of 5 to 7 meters. After tracking, we can use image post-processing techniques to replace the small fiducial projections with the average local image color. For the weights used to compute the redundancy value of a fiducial, we assigned $w_v$ a large weight so as to encourage prompt removal of fiducials in areas were many are visible. For the other weights, $w_d$ and $w_\alpha$, we choose values that, on average, scale the corresponding terms to approximately equal values thus equalizing the tradeoff of distance and angle.

We have used the approach of the invention to generate fiducial positions and camera pose for several test environments. Computing fiducial positions is relatively fast. On a 1 GHz (Gigahertz) personal computer, it takes, on average, less than a minute to compute fiducial sets for the test environments. The floor plans for the test environments were obtained by making simple straight-line measurements using a tape measure. Alternatively, the floor plans could be easily extracted from CAD (computer aided design) files, if such are available.

Figure 10:
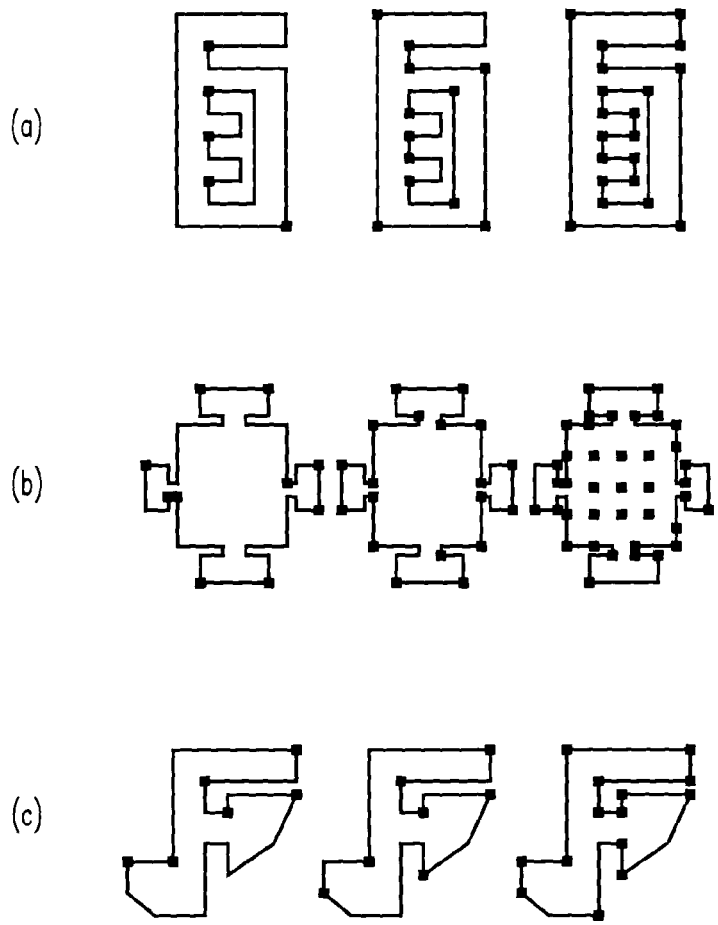
FIGS. 10A through 10C are diagrams illustrating a fiducial planning methodology in three example environments, according to an embodiment of the present invention.

FIGS. 10A through 10C demonstrate the fiducial planning algorithm in three example environments.

In the first environment (FIG. 10A), three fiducial sets are shown for different minimum number of fiducials V in the same environment: Left: V=1; Middle: V=2; and Right: V=4. Other placement constraints remain constant at D=∞ and A=0 degrees. This illustrates the visibility constraint. Thus, the fiducial placement guarantees the minimum number of visible fiducials V is 1, 2 or 4, respectively.

In the second environment (FIG. 10B), three fiducial sets are shown for different maximum distance D to fiducials in the same environment: Left: D=∞; Middle: D=¼ of the floor plan diagonal; and Right: D=⅛ of the floor plan diagonal. Other placement constraints remain constant at V=2 and A=0 degrees. This illustrates the distance constraint. Thus, the fiducial placement guarantees at least two fiducials are always visible and the maximum distance D to the fiducials is either unbounded, ¼ of the floor plan diagonal, or ⅛ of the floor plan diagonal.

In the third environment (FIG. 10C), three fiducial sets are shown for different minimum angles A in the same environment: Left: A=0 degrees; Middle: A=60 degrees; and Right: A=120 degrees. Other placement constraints remain constant at D=∞ and V=2. This illustrates the angle constraint. Thus, the fiducial placement guarantees for any viewpoint within the floor plan at least two fiducials are visible and the angle A between one pair of fiducials and the camera is at least 0, 60, or 120 degrees, respectively.

Figure 11:
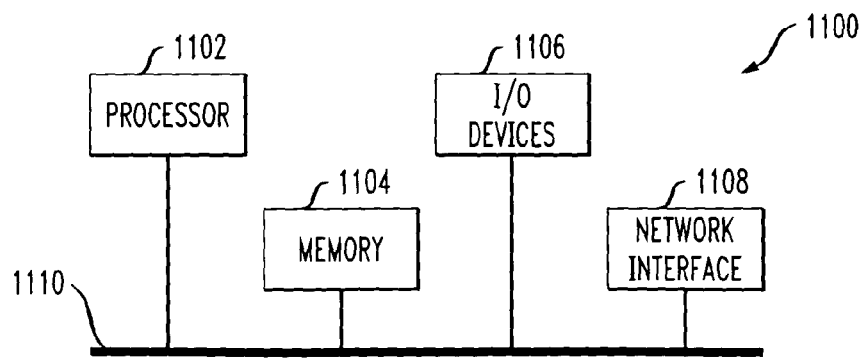
FIG. 11 is a block diagram illustrating a generalized hardware architecture of a computer system suitable for implementing one or more functional components of a pose estimation system, according to an embodiment of the present invention.

Referring finally to FIG. 11, a block diagram illustrates a generalized hardware architecture of a computer system suitable for implementing one or more of the functional components of the pose estimation system as depicted in the figures and explained in detail herein. It is to be understood that the individual components of the pose estimation system, e.g., as illustrated in FIG. 2, may be implemented on one such computer system, or more preferably, on more than one such computer system. In the case of an implementation on a distributed computing system, the individual computer systems and/or devices may be connected via a suitable network, e.g., the Internet or World Wide Web. However, the system may be realized via private or local networks. The pose estimation system is not limited to any particular network. Also, as mentioned above, the components of the system may be implemented in a client/server architecture. Thus, the computer system depicted in FIG. 11 represents a client device or a server.

As shown, the computer system 1100 may be implemented in accordance with a processor 1102, a memory 1104, I/O devices 1106, and a network interface 1108, coupled via a computer bus 1110 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., cameras, keyboards, etc.) for entering data to the processing unit, and/or one or more output devices (e.g., speaker, display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Advantageously, as illustratively explained in detail herein, the invention provides pose estimation particularly suited for panoramic cameras. This approach includes automatic planning of fiducial placements in large complex environments. The fiducial positions are subject to a set of constraints, which in conjunction with an error model enables pose estimation at any desired accuracy.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

By way of example only, the pose estimation system can be adapted to support a self-guided capture mechanism. Using computer-controlled motors, the capture cart could be guided through the environment automatically. Since, approximate pose can be computed in real-time, the system could capture images until a desired image trajectory is acquired or a desired image density is obtained. Simultaneously, an optimization procedure could be continually performed to refine the estimated fiducial locations and camera poses. With regard to the panoramic camera or sensor, the restriction of moving the camera within a plane could be removed. Also, cameras with higher resolutions could be used. Both of these improvements may further refine camera pose estimates.

We claim:

1. A method of estimating pose for a panoramic camera in an environment, comprising the steps of:
   determining placements of fiducials in the environment, wherein fiducial placement is determined in accordance with an automated planning algorithm;
   determining an error-bounded pose of the camera based on projections of the fiducials in images of the environment captured by the camera; and
   refining the fiducial placements so as to obtain fiducial placements that provide bounded error pose estimates.

2. The method of claim 1, wherein the step of determining fiducial placements further comprises the step of satisfying at least one constraint.

3. The method of claim 2, wherein the at least one constraint comprises a constraint associated with the number of visible fiducials.

4. The method of claim 2, wherein the at least one constraint comprises a constraint associated with a distance from a viewpoint to a fiducial.

5. The method of claim 2, wherein the at least one constraint comprises a constraint associated with an angle subtended by vectors from a viewpoint to pairs of fiducials.

6. The method of claim 1, wherein the step of determining fiducial placements in the environment further comprises:
   creating an initial list of fiducials that satisfy at least one constraint;
   prioritizing the fiducials in a placement list; and
   iteratively removing fiducials from the placement list, based on priority, until no more fiducials can be removed while still satisfying the at least one constraint, wherein the placement list, resulting from the iterative removal of fiducials, represents the fiducials to be placed.

7. The method of claim 6, wherein the step of creating an initial list of fiducials comprises the steps of:
   obtaining a floor plan of the environment;
   dividing the floor plan into convex regions; and
   positioning a number of fiducials so as to satisfy the at least one constraint within each convex region.

8. The method of claim 6, wherein the step of prioritizing the fiducials further comprises the steps of:
   dividing the fiducials into two or more categories based on their general positioning within the environment;
   prioritizing the fiducials within each category based on how effectively they satisfy the at least one constraint; and
   prioritizing the fiducial categories based on their general effectiveness as fiducial locations.

9. The method of claim 1, wherein the step of determining an error-bounded pose of the camera further comprises:
   tracking the fiducials based on their projections in the captured images; and
   triangulating the pose of the camera relative to the tracked fiducials.

10. The method of claim 1, further comprising the step of adapting the pose determination so as to obtain an improved pose per image by refining pose and overall fiducial positions in the images.

11. An apparatus for estimating pose for a panoramic camera in an environment, comprising:
   a memory; and
   at least one processor coupled to the memory and operative to: (i) determine placements of fiducials in the environment, wherein fiducial placement is determined in accordance with an automated planning algorithm; (ii) determine an error-bounded pose of the camera based on projections of the fiducials in images of the environment captured by the camera; and (iii) refine the fiducial placements so as to obtain fiducial placements that provide bounded error pose estimates.

12. The apparatus of claim 11, wherein the operation of determining fiducial placements further comprises the step of satisfying at least one constraint.

13. The apparatus of claim 12, wherein the at least one constraint comprises a constraint associated with the number of visible fiducials.

14. The apparatus of claim 12, wherein the at least one constraint comprises a constraint associated with a distance from a viewpoint to a fiducial.

15. The apparatus of claim 12, wherein the at least one constraint comprises a constraint associated with an angle subtended by vectors from a viewpoint to pairs of fiducials.

16. The apparatus of claim 11, wherein the operation of determining fiducial placements in the environment further comprises:
   creating an initial list of fiducials that satisfy at least one constraint;
   prioritizing the fiducials in a placement list; and
   iteratively removing fiducials from the placement list, based on priority, until no more fiducials can be removed while still satisfying the at least one constraint, wherein the placement list, resulting from the iterative removal of fiducials, represents the fiducials to be placed.

17. The apparatus of claim 16, wherein the operation of creating an initial list of fiducials comprises the steps of:
   obtaining a floor plan of the environment;
   dividing the floor plan into convex regions; and
   positioning a number of fiducials so as to satisfy the at least one constraint within each convex region.

18. The apparatus of claim 16, wherein the operation of prioritizing the fiducials further comprises the steps of:
   dividing the fiducials into two or more categories based on their general positioning within the environment;
   prioritizing the fiducials within each category based on how effectively they satisfy the at least one constraint; and
   prioritizing the fiducial categories based on their general effectiveness as fiducial locations.

19. The apparatus of claim 11, wherein the operation of determining an error-bounded pose of the camera further comprises:
   tracking the fiducials based on their projections in the captured images; and
   triangulating the pose of the camera relative to the tracked fiducials.

20. The apparatus of claim 11, wherein the at least one processor is further operative to adapt the pose determination so as to obtain an improved pose per image by refining pose and overall fiducial positions in the images.

21. An article of manufacture for estimating pose for a panoramic camera in an environment, comprising a non-transitory machine readable medium containing one or more programs which when executed implement the steps of:
   determining placements of fiducials in the environment, wherein fiducial placement is determined in accordance with an automated planning algorithm;
   determining an error-bounded pose of the camera based on projections of the fiducials in images of the environment captured by the camera; and
   refining the fiducial placements so as to obtain fiducial placements that provide bounded error pose estimates.

* * * * *